United States Patent [19]
Isensee et al.

[11] Patent Number: 6,016,494
[45] Date of Patent: Jan. 18, 2000

[54] EXPANDING WEB DOCUMENTS BY MERGING WITH LINKED DOCUMENTS

[75] Inventors: Scott Harlan Isensee, Georgetown; Rick Lee Poston; I-Hsing Tsao, both of Austin; Richard Edmond Berry, Georgetown, all of Tex.

[73] Assignee: International Business Machines Corporation, Armonk, N.Y.

[21] Appl. No.: 08/976,170

[22] Filed: Nov. 21, 1997

[51] Int. Cl.[7] .................................................. G06F 17/30
[52] U.S. Cl. ........................... 707/102; 707/513; 707/514
[58] Field of Search ................................. 707/102, 513, 707/514

[56] References Cited

U.S. PATENT DOCUMENTS

| | | | |
|---|---|---|---|
| 5,303,379 | 4/1994 | Khoyi et al. | 395/700 |
| 5,784,562 | 7/1998 | Diener | 395/200.47 |
| 5,809,250 | 9/1998 | Kisor | 395/200.57 |
| 5,822,539 | 10/1998 | Van Hoff | 395/200.66 |

*Primary Examiner*—Thomas G. Black
*Assistant Examiner*—William Trinh
*Attorney, Agent, or Firm*—Richard A. Henkler; Jack V. Musgrove; Andrew J. Dillon

[57] ABSTRACT

A method of accessing electronic information, by loading an original document onto a data processing system, selecting a link embedded in the original document (wherein the link is associated with a linked document), and creating a new document by merging the linked document with the original document. Other new documents can similarly be created by merging additional linked documents with the earlier new documents in response to the further selection of other links embedded in the new documents. The original document and one or more linked documents can thus be displayed as a single, unitary file, as well as being printed as a single document. The linked document can be merged with the original document in a variety of manners. The invention is particularly useful in accessing hypertext pages on the World Wide Web of the Internet.

18 Claims, 8 Drawing Sheets

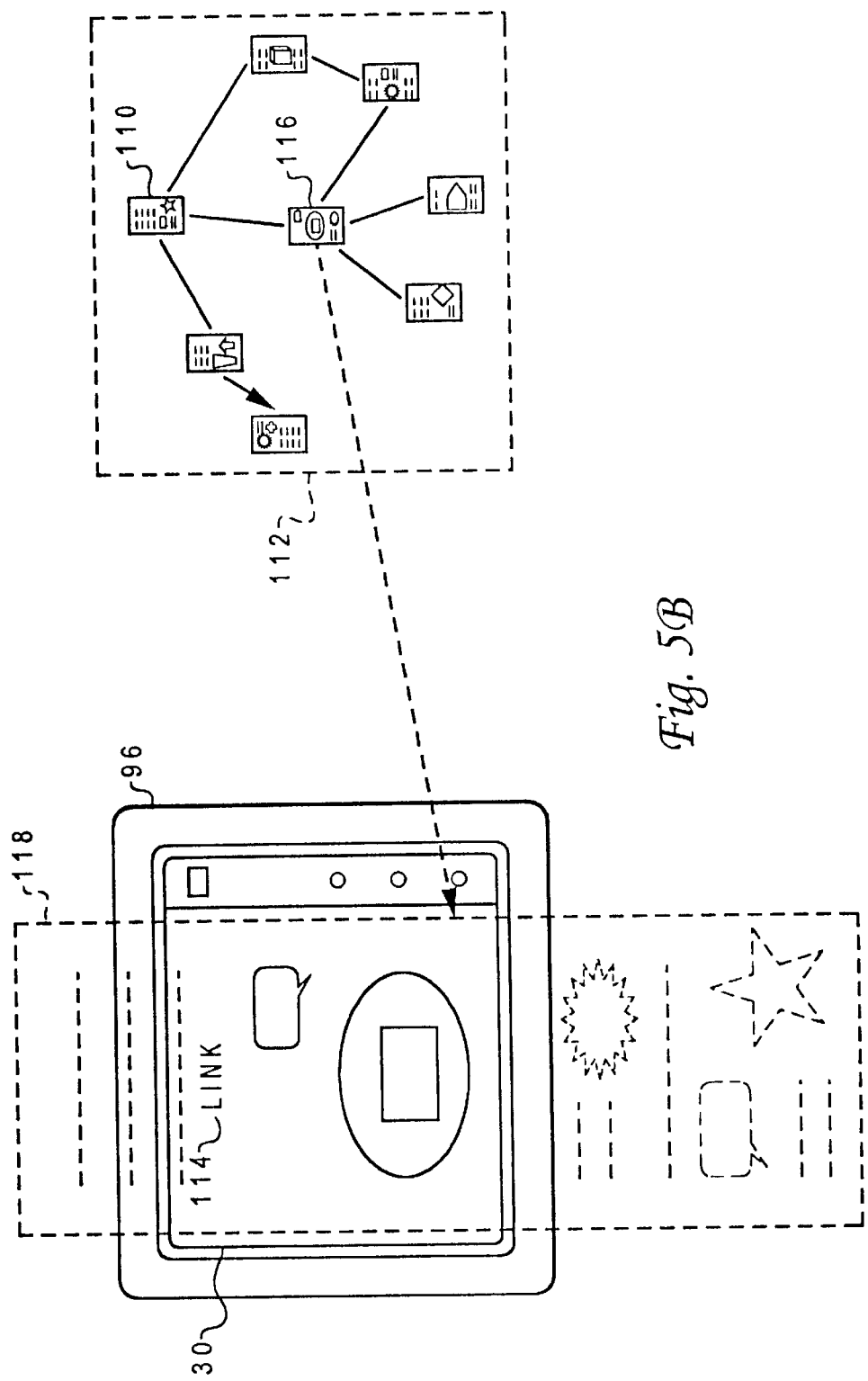

EXPANDING WEB DOCUMENTS BY MERGING WITH LINKED DOCUMENTS

BACKGROUND OF THE INVENTION

1. Field of the Invention

The present invention generally relates to computer systems, and more particularly to a method and system for viewing or examining documents transmitted across a computer network. The present invention is adapted for use with the Internet's World Wide Web, but it is generally applicable to any network which provides files or "pages" having embedded links (such as hypertext links) that allow the retrieval of other pages.

2. Description of Related Art

A generalized client-server computing network 2 is shown in FIG. 1. Network 2 has several servers 4, 6, 8 and 10 which are interconnected, either directly to each other or indirectly through one of the other servers. Each server is essentially a stand-alone computer system (having one or more processors, memory devices, and communications devices), but has been adapted (programmed) for one primary purpose, that of providing information to individual users at workstation clients 12. A client is a member of a class or group of computers or computer systems that uses the services of another class or group to which it is not related. Clients 12 can also be stand-alone computer systems (like personal computers, or PCs), or "dumber" systems adapted for limited use with network 2 (like network computers, or NCs). As used herein, "PC" generally refers to any multi-purpose computer adapted for use by a single individual, regardless of the manufacturer, hardware platform, operating system, etc. A single, physical computer can act as both a server and a client, although this implementation occurs infrequently.

The information provided by a server can be in the form of programs which run locally on a given client 12, or in the form of data such as files used by other programs. Users can also communicate with each other in real-time as well as by delayed file delivery, i.e., users connected to the same server can all communicate with each other without the need for the network 2, and users at different servers, such as servers 4 and 6, can communicate with each other via network 2. The network can be local in nature, or can be further connected to other systems (not shown) as indicated with servers 8 and 10.

The construction of network 2 is also generally applicable to the Internet. In the context of a computer network such as the Internet, a client is a process (i.e., a program or task) that requests a service which is provided by another program. The client process uses the requested service without having to "know" any working details about the other program or the service itself. Based upon requests by the user, a server presents filtered electronic information to the user as server responses to the client process.

Conventional protocols and services have been established for the Internet which allow the transfer of various types of information, including electronic mail, simple file transfers via FTP, remote computing via TELNET, gopher searching, Usenet newsgroups, and hypertext file delivery and multimedia streaming via the World Wide Web (WWW). A given server can be dedicated to performing one of these operations, or running multiple services. Internet services are typically accessed by specifying a unique address, or universal resource locator (URL). The URL has two basic components, the protocol to be used, and the object pathname. For example, the URL "http://www.uspto.gov" (home page for the U.S. Patent & Trademark Office) specifies a hypertext transfer protocol ("http") and a pathname of the server ("www.uspto.gov"). The server name is associated with a unique numeric value (a TCP/IP address, or "domain").

The present invention relates to the display or examination of interrelated files on a network like the Internet, but is particularly applicable to the World Wide Web, which provides files that are conveniently linked for user access. As illustrated in FIG. 2, a group 14 of documents or "pages" 16a–16h are interrelated by providing hypertext links in each of the files. A hypertext link is an image that is viewable on the workstation's display 18, which can be selected by the user (e.g., using a pointing device or "mouse") and which then automatically instructs client workstation 12 to request another page associated with that particular hypertext link (i.e., issue another URL). A hypertext link may appear as a picture, or as a word or sentence, possibly underlined or otherwise accentuated to indicate that it is an embedded link and not just normal, informative text.

A WWW page may have text, graphic (still) images, and even multimedia objects such as sound recordings or moving video clips. A hypertext page, if more than just text, is usually constructed by loading several separate files. For example, the hypertext file "main.html" might include a reference to a graphic image file "picture.gif" or to a sound file "beep.wav". When a client workstation 12 sends a request to a server for a page, such as page 16a, the server first transmits (at least partially) the main hypertext file associated with the page, and then loads, either sequentially or simultaneously, the other files associated with the page. A given file may further be transmitted as several separate pieces via TCP/IP protocol. The fully constructed page is then displayed on the workstation monitor 18 as shown in FIG. 2. A page may be "larger" than the physical size of the monitor screen, and techniques such as scroll bars are used by the viewing software (the web browser) to view different portions of the page.

One deficiency of conventional web browsers is that, when a user takes a link, an entirely new page is loaded in the browser, which completely replaces the old page. The old page is not displayed simultaneously with the new page, although the user can easily flip back and forth between the two pages (whose contents are commonly cached on the client), using the familiar browser commands "forward" and "backward." Nonetheless, it is often desirable to see both the original page and the linked page at the same time, but this is not possible with prior art web browsers unless complicated steps are taken. For example, two different browser windows can be opened; some browsers allow multiple parent windows while others only allow multiple children windows. In either implementation, additional user involvement is required, and the construction and display of the separate window takes additional system resources. It may also be difficult to arrange the two windows on the display so as to satisfactorily view or scroll through the two pages. Similarly, each page must be printed separately even though it might be desirable to print them together as a unitary document.

One innovation in web browsers allows the simultaneous display of multiple fields or "frames" within a single browser window, but this feature cannot be used to simultaneously display an original page and a linked page. Rather, all of the frames within the window collectively constitute the "page" or document, so when a hypertext link in any given frame is selected, this original page is still replaced. In other words, selection of the link will result in (i) the contents of at least one of the frames being substantially replaced (usually the frame that contained the link), if not all of the frames, (ii) the frames being redesigned along with the replacement of their contents, or (iii) the complete elimination of frames, with replacement by a new (single-frame) page. In light of the foregoing, it would be desirable to provide a more convenient method of allowing a network user (web surfer) to display or examine linked pages. It would be further advantageous if multiple web pages could be combined for any number of links, placing all of the referenced information in context.

SUMMARY OF THE INVENTION

It is therefore one object of the present invention to provide an improved method of accessing information provided by a computer network.

It is another object of the present invention to provide such a method which is particularly applicable to the World Wide Web and documents having hypertext-type links.

It is yet another object of the present invention to provide such a method that combines two or more pages into a unitary document for both display and printing.

The foregoing objects are achieved in a method of accessing electronic information, generally comprising the steps of loading an original document onto a data processing system, selecting a link embedded in the original document, wherein the link is associated with a linked document, and creating a new document by merging the linked document with the original document. A second new document can similarly be created by merging a second linked document with the first new document in response to the further selection of a second link embedded in the first new document. The original and linked documents can thus be displayed as a single, unitary file, as well as being printed as a single document. The linked document can be merged with the original document in a variety of manners, including (i) insertion of the contents of the linked document at a location of the link within the original document, (ii) insertion of the contents of the linked document at an end of the original document, or (iii) placement of the linked document in a first pane of the new document, and placement of the original document in a second pane of the new document. In the implementation wherein the data processing system is a client on a computer network, the original document can be loaded by transmitting it from a server of the computer network (e.g., the Internet). Additional features can be provided, such as the ability to expand the original document by integrating all other available documents which are directly linked to the original document.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

FIG. 5B is an illustration of the display screen of FIG. 5A wherein the browser of the present invention displays a new document created by merging the original document with a linked document, in a nest manner;

DESCRIPTION OF AN ILLUSTRATIVE EMBODIMENT

Figure 1:
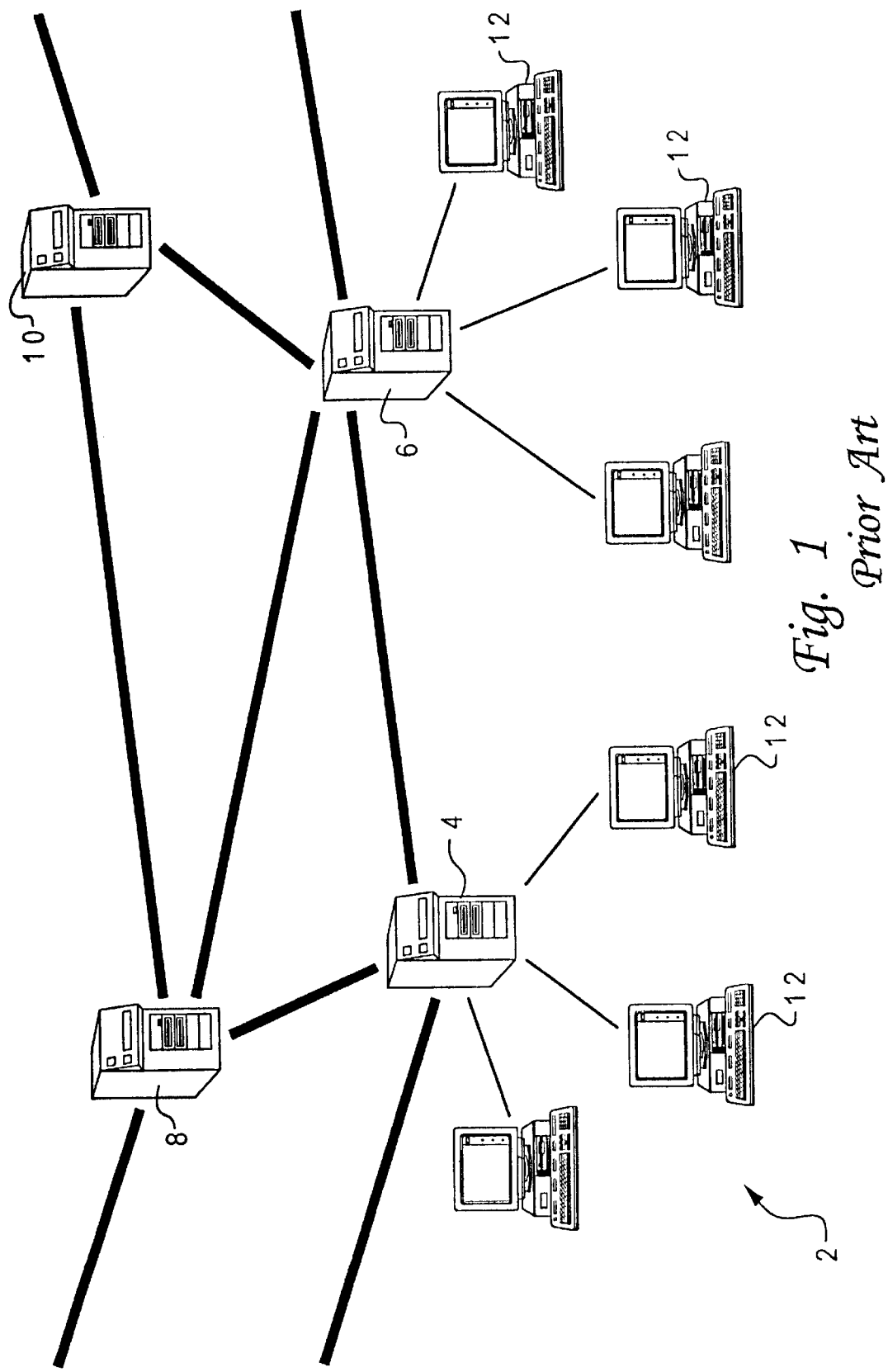
FIG. 1 is a diagram of a conventional computer network, including interconnected servers and workstation clients.
Figure 2:
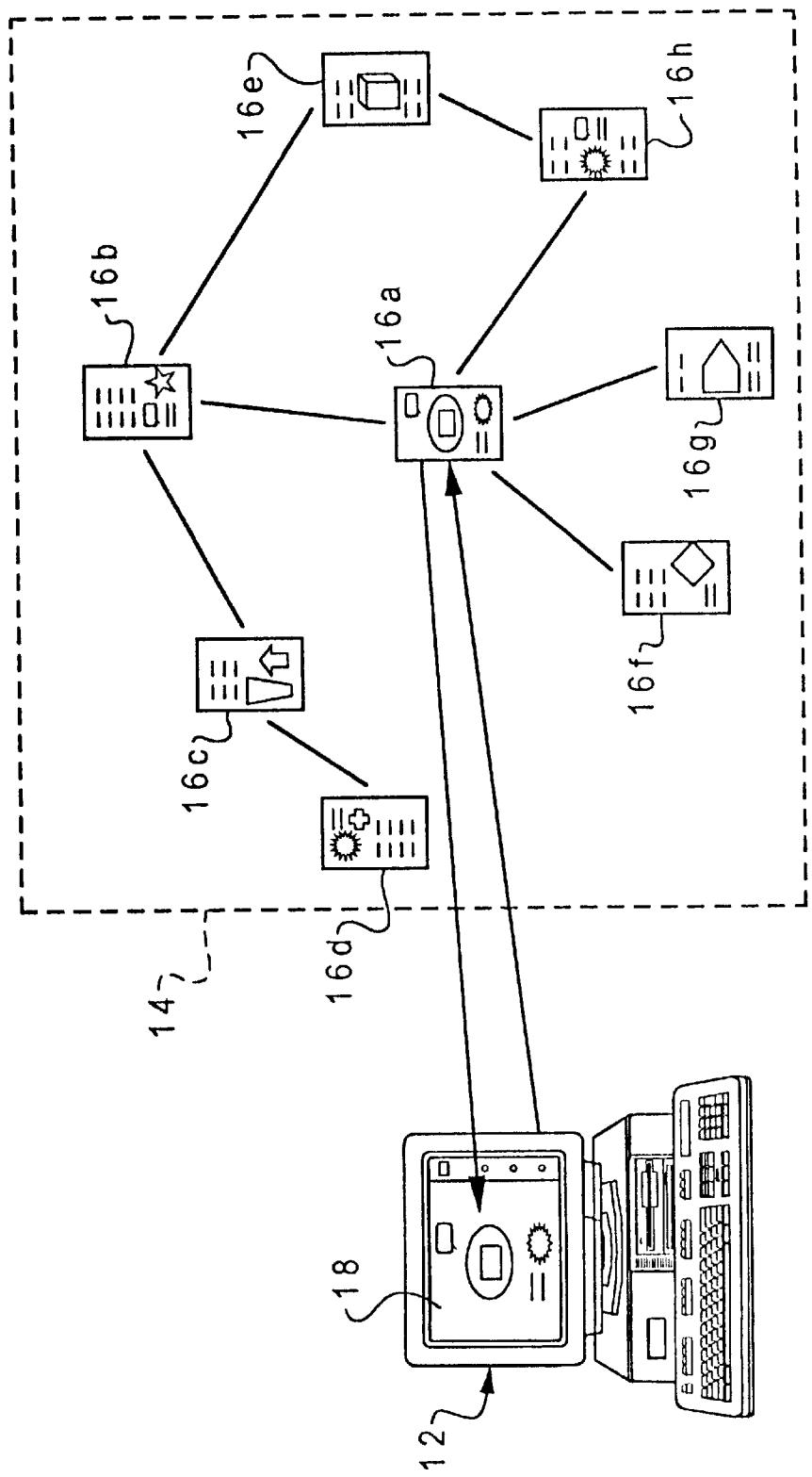
FIG. 2 is a representation of retrieval of an object from a set of linked objects residing on a network, such as a page on the World Wide Web.

The present invention is directed to a method of displaying, viewing or examining several documents which are which are transmitted across a computer network, such as the network of FIG. 1, and particularly to a method and computer program product for expanding a page on the World Wide Web (WWW) by combining it with one or more linked pages. The invention may, however, be implemented in other networks besides the Internet. Therefore, while the present invention may be understood with reference to FIG. 1, this reference should not be construed in a limiting sense.

Figure 3:
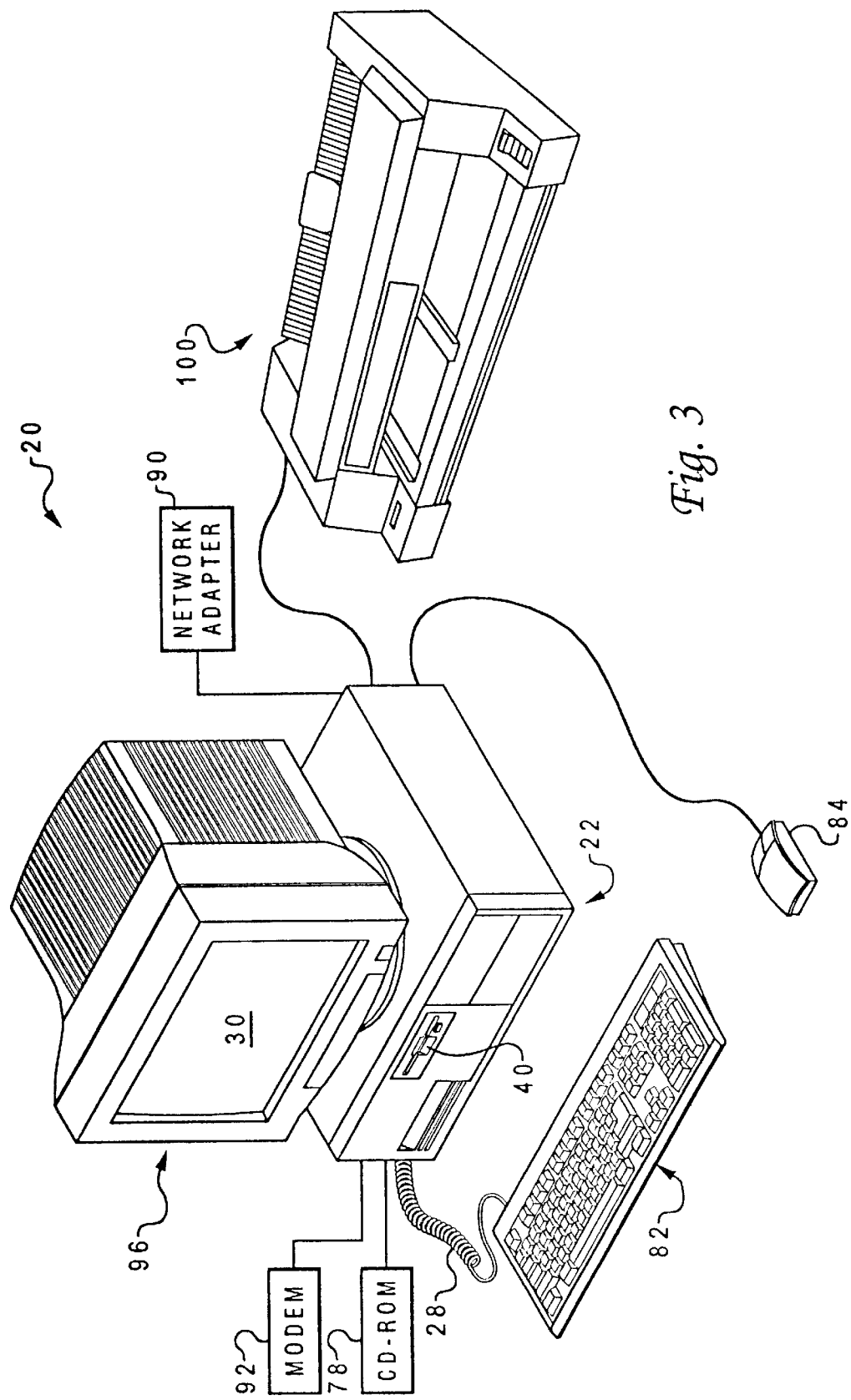
FIG. 3 is an illustration of one embodiment of a data processing system in which the present invention can be practiced.

With further reference to FIG. 3, a data processing system 20 is shown in which the present invention can be practiced. The data processing system 20 includes processor 22, keyboard 82, and display 96. Keyboard 82 is coupled to processor 22 by a cable 28. Display 96 includes display screen 30, which may be implemented using a cathode ray tube (CRT), a liquid crystal display (LCD), an electrode luminescent panel or the like. The data processing system 20 also includes pointing device 84, which may be implemented using a track ball, a joy stick, touch sensitive tablet or screen, track path, or as illustrated a mouse. The pointing device 84 may be used to move a pointer or cursor on display screen 30. Processor 22 may also be coupled to one or more peripheral devices such a modem 92, CD-ROM 78, network adapter 90, and floppy disk drive 40, each of which may be internal or external to the enclosure or processor 22. An output device such as a printer 100 may also be coupled with processor 22.

It should be noted and recognized by those persons of ordinary skill in the art that display 96, keyboard 82, and pointing device 84 may each be implemented using any one of several known off-the-shelf components.

Figure 4:
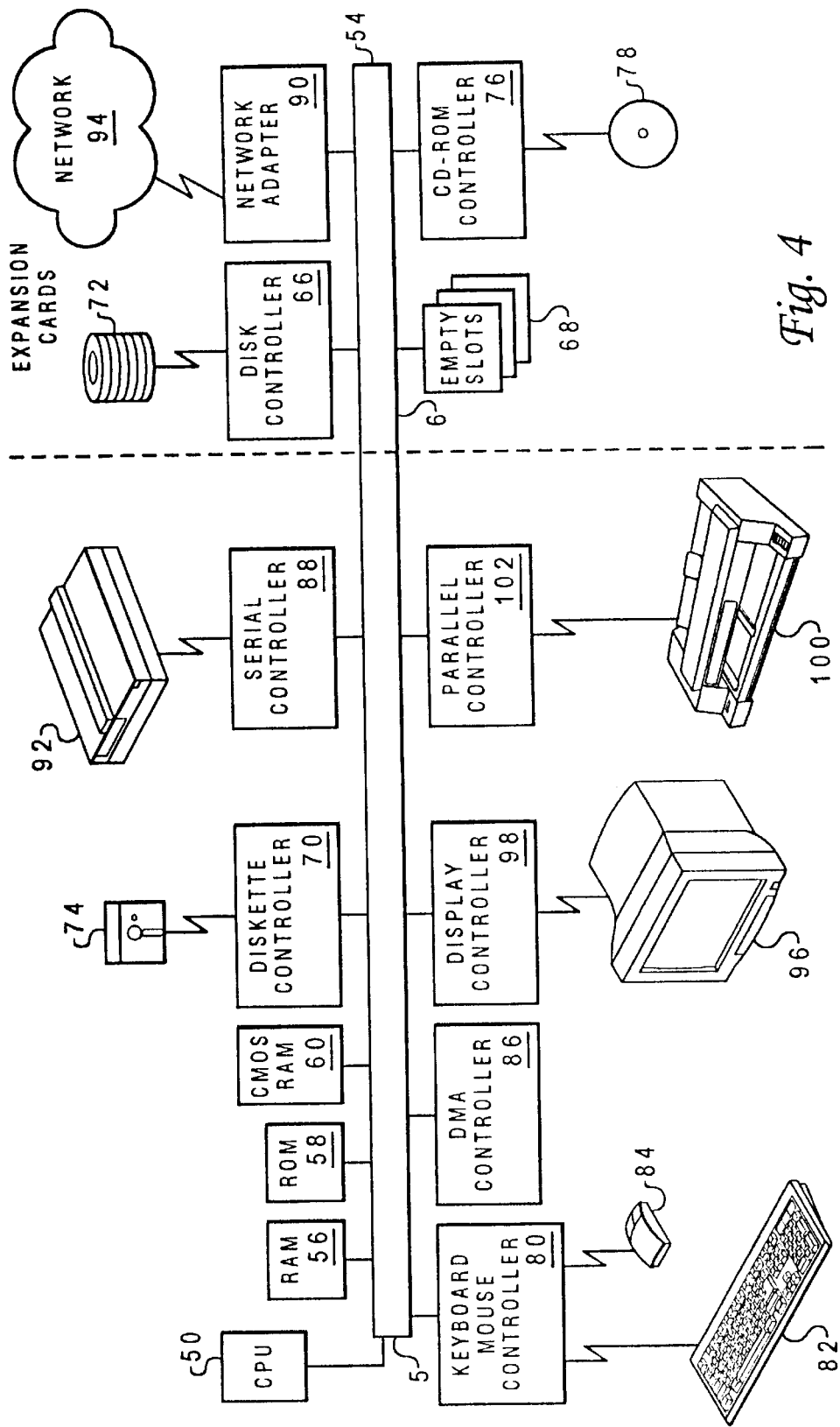
FIG. 4 is a high-level block diagram illustrating selected components that can be included in the data processing system of FIG. 3 according to the teachings of the present invention.

Reference now being made to FIG. 4, a high level block diagram is shown illustrating selected components that can be included in the data processing system 20 of FIG. 3 according to the teachings of the present invention. The data processing system 20 is controlled primarily by computer readable instructions, which can be in the form of software, wherever, or by whatever means such software is stored or accessed. Such software may be executed within the Central Processing Unit (CPU) 50 to cause data processing system 20 to do work.

Memory devices coupled to system bus 5 include Random Access Memory (RAM) 56, Read Only Memory (ROM) 58, and nonvolatile memory 60. Such memories include circuitry that allows information to be stored and retrieved. ROMs contain stored data that cannot be modified. Data stored in RAM can be changed by CPU 50 or other hardware devices. Nonvolatile memory is memory that does not lose data when power is removed from it. Nonvolatile memories include ROM, EPROM, flash memory, or battery-pack CMOS RAM. As shown in FIG. 4, such battery-pack CMOS RAM may be used to store configuration information.

An expansion card or board is a circuit board that includes chips and other electronic components connected that adds functions or resources to the computer.

Typically, expansion cards add memory, disk-drive controllers 66, video support, parallel and serial ports, and internal modems. For lap top, palm top, and other portable computers, expansion cards usually take the form of PC cards, which are credit card-sized devices designed to plug into a slot in the side or back of a computer. An example of such a slot is PCMCIA slot (Personal Computer Memory Card International Association) which defines type I, II and III card slots. Thus, empty slots 68 may be used to receive various types of expansion cards or PCMCIA cards.

Disk controller 66 and diskette controller 70 both include special purpose integrated circuits and associated circuitry that direct and control reading from and writing to hard disk drive 72, and a floppy disk or diskette 74, respectively. Such disk controllers handle tasks such as positioning read/write head, mediating between the drive and the CPU 50, and controlling the transfer of information to and from memory. A single disk controller may be able to control more than one disk drive.

CD-ROM controller 76 may be included in data processing 20 for reading data from CD-ROM 78 (compact disk read only memory). Such CD-ROMs use laser optics rather than magnetic means for reading data.

Keyboard mouse controller 80 is provided in data processing system 20 for interfacing with keyboard 82 and pointing device 84. Such pointing devices are typically used to control an on-screen element, such as a graphical pointer or cursor, which may take the form of an arrow having a hot spot that specifies the location of the pointer when the user presses a mouse button. Other pointing devices include a graphics tablet, stylus, light pin, joystick, puck, track ball, track pad, and the pointing device sold under the trademark "Track Point" by International Business Machines Corp. (IBM).

Communication between processing system 20 and other data processing systems may be facilitated by serial controller 88 and network adapter 90, both of which are coupled to system bus 5. Serial controller 88 is used to transmit information between computers, or between a computer and peripheral devices, one bit at a time over a single line. Serial communications can be synchronous (controlled by some standard such as a clock) or asynchronous (managed by the exchange of control signals that govern the flow of information). Examples of serial communication standards include RS-232 interface and the RS-422 interface. As illustrated, such a serial interface may be used to communicate with modem 92. A modem is a communication device that enables a computer to transmit information over standard telephone lines. Modems convert digital computer signals to interlock signals suitable for communications over telephone lines. Modem 92 can be utilized to connect data processing system 20 to an on-line information service, such as an information service provided under the service mark "PRODIGY" by IBM and Sears. Such online service providers may offer software that can be down loaded into data processing system 20 via modem 92. Modem 92 may provide a connection to other sources of software, such as a server, an electronic bulletin board (BBS), or the Internet (including the World Wide Web).

Network adapter 90 may be used to connect data processing system 20 to a local area network 94. Network 94 may provide computer users with means of communicating and transferring software and information electronically. Additionally, network 94 may provide distributed processing, which involves several computers in the sharing of workloads or cooperative efforts in performing a task. Network 94 can also provide a connection to other systems like those mentioned above (a BBS, the Internet, etc.).

Display 96, which is controlled by display controller 98, is used to display visual output generated by data processing system 20. Such visual output may include text, graphics, animated graphics, and video. Display 96 may be implemented with CRT-based video display, an LCD-based flat panel display, or a gas plasma-based flat-panel display. Display controller 98 includes electronic components required to generate a video signal that is sent to display 96.

Printer 100 may be coupled to data processing system 20 via parallel controller 102. Printer 100 is used to put text or a computer-generated image (or combinations thereof) on paper or on another medium, such as a transparency sheet. Other types of printers may include an image setter, a plotter, or a film recorder.

Parallel controller 102 is used to send multiple data and control bits simultaneously over wires connected between system bus 5 and another parallel communication device, such as a printer 100.

CPU 50 fetches, decodes, and executes instructions, and transfers information to and from other resources via the computers main data-transfer path, system bus 5. Such a bus connects the components in a data processing system 20 and defines the medium for data exchange. System bus 5 connects together and allows for the exchange of data between memory units 56, 58, and 60, CPU 50, and other devices as shown in FIG. 4. Those skilled in the art will appreciate that a data processing system constructed in accordance with the present invention may have multiple components selected from the foregoing, including even multiple processors.

Figure 5A:
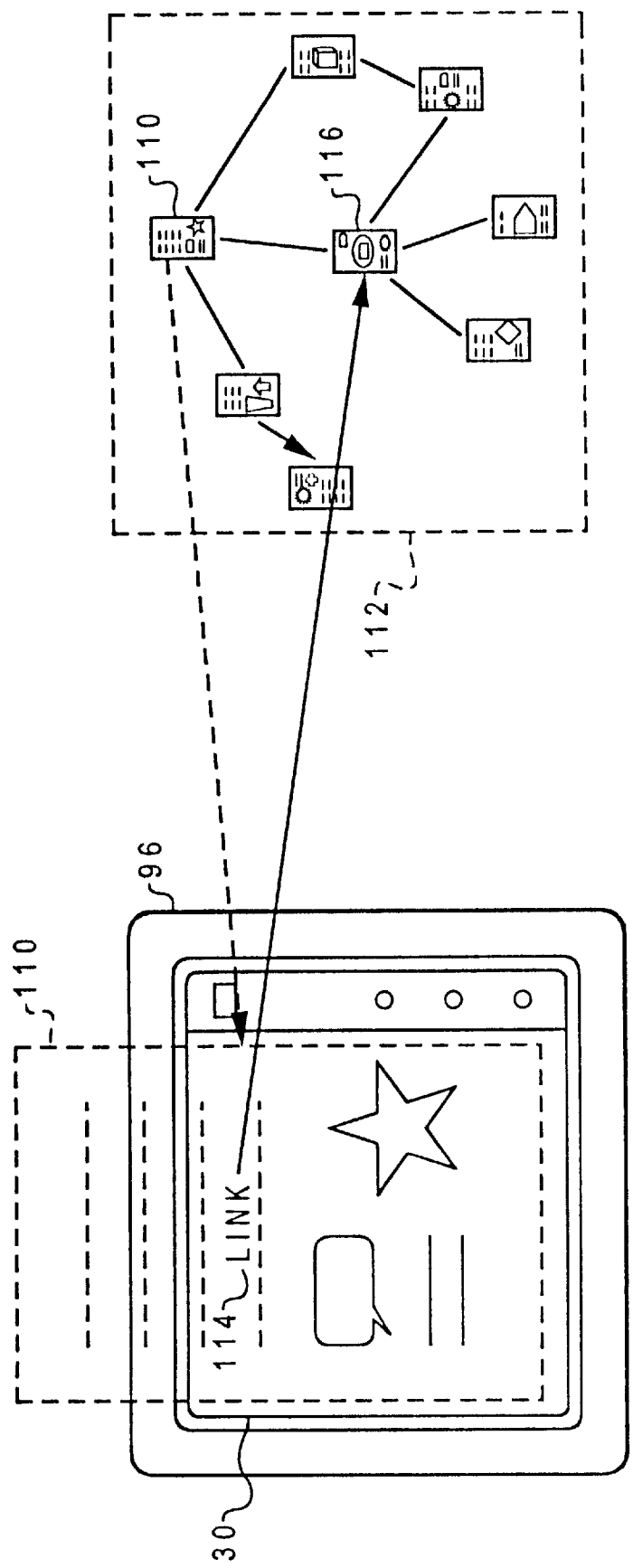
FIG. 5A is an illustration of the display screen (video monitor) of FIGS. 3 and 4, generating a browser provided in accordance with the present invention, wherein the browser displays a portion of an original page which was downloaded from a network.

Referring now to FIGS. 5A and 5B, one implementation of the present invention allows data processing system 20 to act as a client and display two or more web pages as a single document, in a nested manner, on display screen 30 of display 96. FIG. 5A depicts an original web page 110 which is one of a group 112 of documents or web pages that are interrelated by hypertext links embedded in each of the files (the files may or may not be located on the same server or web site). Page 110 has been loaded in a web browser provided according to the present invention for data processing system 20. The outline of page 110 is shown in dashed lines on the left-hand side of FIG. 5A to indicate that, as noted above, a page can be larger than the actual size available in the browser window for viewing the page. The user can view different sections of a retrieved document using various features of the browser's graphical user interface (GUI), such as scroll bars.

Page 110 includes a link 114 to another page 116 in group 112. When a user takes link 114, page 116 is inserted into page 110 to create an expanded page 118, which is then displayed for the user as shown in FIG. 5B. In this manner, the user can see both the original page and the linked page, so the referenced information can be seen in context. The browser of the present invention creates new page 118 by merging the hypertext markup language (HTML) from each page 110 and 116 to construct a single document. If the user desires, both pages can be printed together in this nested fashion by simply printing the single document 118. Additional pages can be merged into page 118 to create other new pages, when the user selects other links in the displayed document.

Figure 5C:
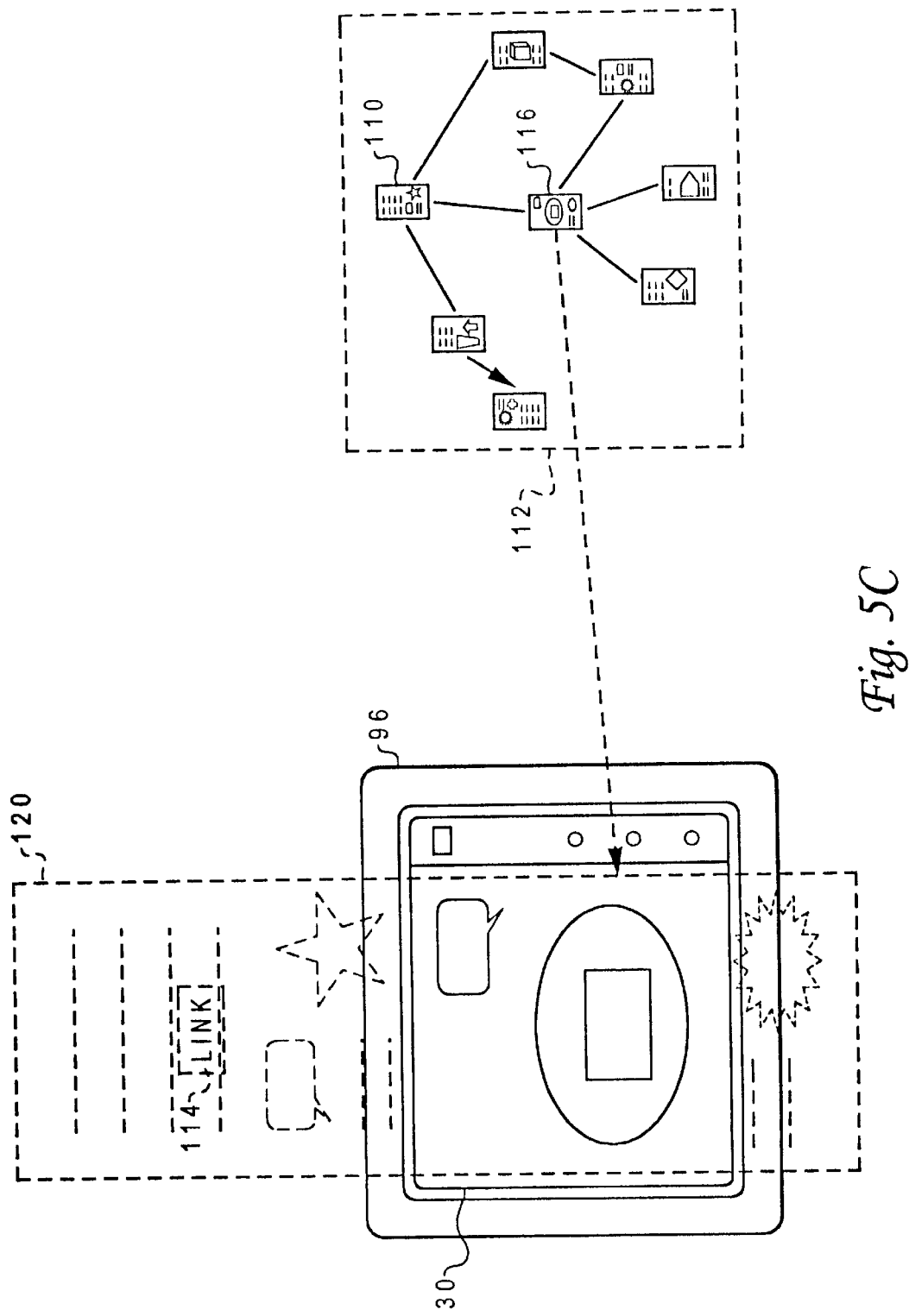
FIG. 5C is an illustration of the display screen of FIG. 5A wherein the browser of the present invention alternatively displays a new document created by merging the original document with a linked document, in a serial manner.
Figure 5D:
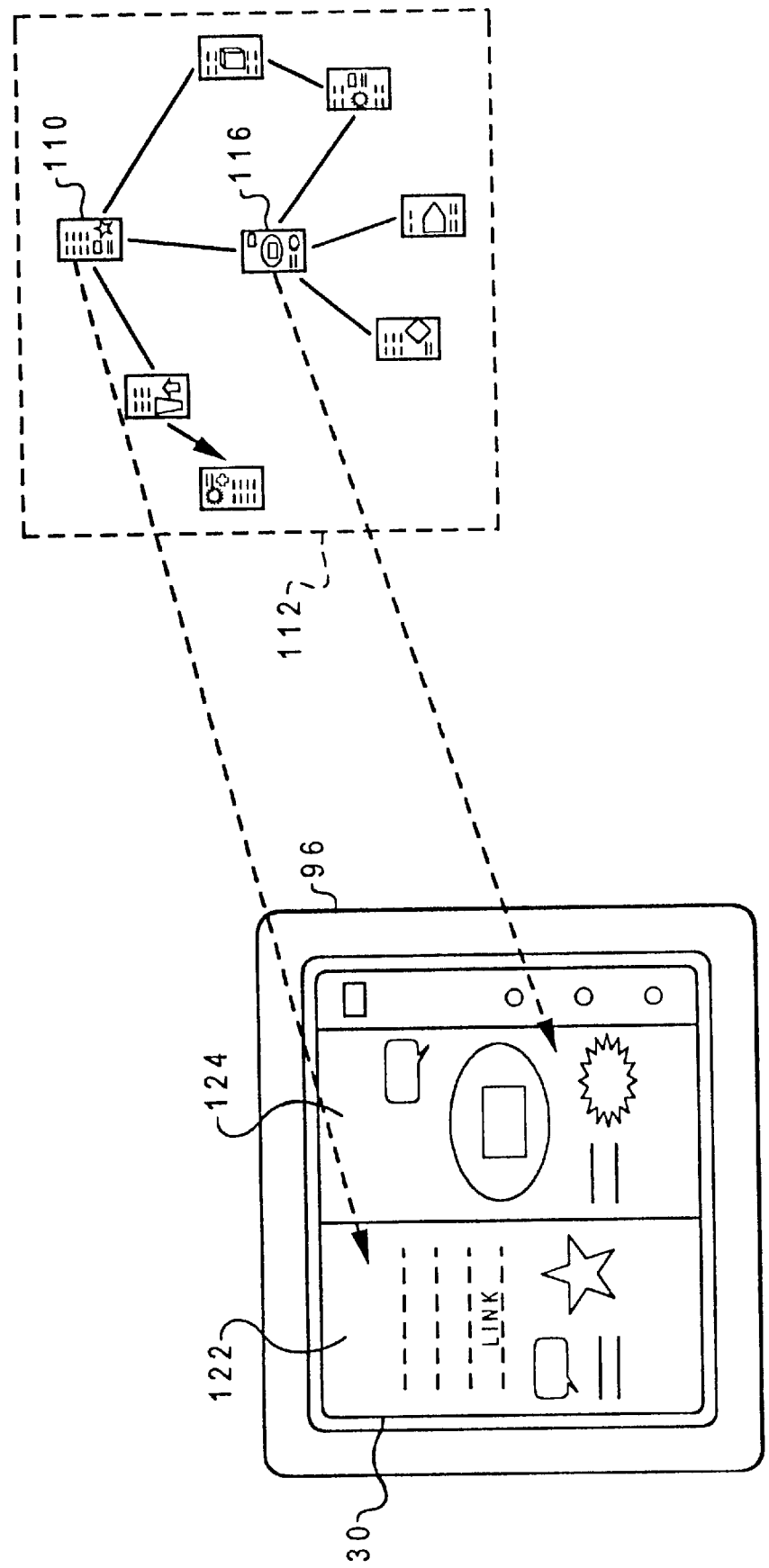
FIG. 5D is an illustration of the display screen of FIG. 5A wherein the browser of the present invention alternatively displays a new document created by merging the original document with a linked document, in respective panes of the browser window, and further changes the viewing scale.

In the implementation of FIG. 5B, the contents of page 116 are inserted at the location of link 114 within page 110 (nested within the document). The present invention allows multiple web pages to be combined and displayed together in other manners as well. For example, as shown in FIG. 5C, the linked page could be added to the end of the original page (rather than nested) to construct the new page 120. Alternatively, as further depicted in FIG. 5D, the invention may be implemented by breaking the browser window into two or more panes with one web page in each pane, e.g., page 110 in pane 122 and page 116 in pane 124. FIG. 5D also illustrates how the invention can automatically resize the window (scale down graphics and fonts) when merging documents. Resizing can be an optional features, i.e., a dialog box item can toggle a bit between enabled and disabled states to allow automatically resizing (various resizing options might be set in the dialog box, such as the minimum font/scale to be used, or whether thumbnail images are to be displayed).

The present invention may be selectively (optionally) implemented using a menu command that activates or deactivates document expansion. Various other options can be enabled when document expansion is active. For example, expansion can be performed for any number of links, so a maximum limit might be set with a dialog box. That dialog box might also allow the user to select from among the various types of expansion provided (nested, serial, paned, etc.). The user might further be allowed to collapse the new page and return to viewing only the original page, such as by clicking on the link when the expanded page is already being displayed.

Additional features can be implemented with the present invention to further enhance the collection of multiple pages into a single document. For example, a user might desire to quickly expand a page to integrate all directly linked pages (that are available). A special menu command might be provided for this purpose, facilitating construction of a more comprehensive document which can then be viewed or printed out for later perusal. The merged document can optionally be marked with special characters or flags to indicate the insertion of a linked page (perhaps by including the URL of the linked page). This feature ("expand all") can be further extended to include pages which are indirectly linked to the original page. The limits of such a multi-level, expanded document might be set by establishing a maximum link depth (e.g., no pages more than 5 links away), or by using more sophisticated methods such as limiting incorporation of pages to those residing in the same domain, server, directory, etc.

An options menu might be made available for all of the foregoing options when, for example, the user performs a special selection operation on a link (such as using the right button on a mouse, rather than the left button, to select the link).

The present invention overcomes prior art deficiencies which required a user to flip back and forth between two or more pages in an attempt to mentally merge the information. The invention achieves these improvements in a manner which is convenient to implement, and without requiring multiple browser instances which take up more system resources.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

We claim:

1. A method of accessing electronic information, comprising the steps of:

loading an original document onto a data processing system;

selecting, at the data processing system, a link embedded in the original document, the link being associated with a linked document; and creating a new document by merging the linked document with the original document, in response to said selecting step.

2. The method of claim 1 wherein the embedded link is a first link, the linked document is a first linked document, and the new document is a first new document, and further comprising the steps of:

selecting, at the data processing system, a second link embedded in the first new document, the second link being associated with a second linked document; and creating a second new document by merging the second linked document with the first new document.

3. The method of claim 1 further comprising the step of printing the new document.

4. The method of claim 1 further comprising the step of displaying the new document at the data processing system.

5. The method of claim 1 wherein the linked document is merged with the original document by inserting the contents of the linked document at a location of the link within the original document.

6. The method of claim 1 wherein the linked document is merged with the original document by inserting the contents of the linked document at an end of the original document.

7. The method of claim 1 wherein the linked document is merged with the original document by placing the linked document in a first pane of the new document, and placing the original document in a second pane of the new document.

8. The method of claim 1 wherein:

the data processing system is a client of a computer network; and said loading step includes the step of transmitting the original document from a server of the computer network.

9. The method of claim 1 wherein said creating step merges the linked document with the original document as part of the further step of expanding the original document by integrating all other available documents which are directly linked to the original document.

10. A computer program product comprising:

a storage medium adapted to be read by a computer; and program means stored on said storage medium for displaying an original document on a display of the computer, and creating a new document by merging a linked document with the original document in response to selection of a link embedded in the original document, wherein the link is associated with the linked document.

11. The computer program product of claim 10 wherein:

the embedded link is a first link;

the linked document is a first linked document;

the new document is a first new document; and said program means is further adapted for creating a second new document by merging a second linked document with the first new document in response to the further selection of a second link embedded in the first new document, wherein the second link is associated with the second linked document.

12. The computer program product of claim 10 wherein said program means is further adapted for printing the new document on a printer of the computer.

13. The computer program product of claim 10 wherein said program means is further adapted for displaying the new document on the display.

14. The computer program product of claim 10 wherein said program means is further adapted for merging the linked document with the original document by inserting the contents of the linked document at a location of the link within the original document.

15. The computer program product of claim 10 wherein said program means is further adapted for merging the linked document with the original document by inserting the contents of the linked document at an end of the original document.

16. The computer program product of claim 10 wherein said program means is further adapted for merging the linked document with the original document by placing the linked document in a first pane of the new document, and placing the original document in a second pane of the new document.

17. The computer program product of claim 10 wherein said program means is further adapted for loading the original document and the linked document from a computer network connected to the computer.

18. The computer program product of claim 10 wherein said program means merges the linked document with the original document as part of the further function of expanding the original document by integrating all other available documents which are directly linked to the original document.

* * * * *